United States Patent [19]

Lovitt, Jr.

[11] Patent Number: 4,941,408
[45] Date of Patent: Jul. 17, 1990

[54] ADJUSTABLE FRAME FOR RAIL WHEELS ON MOTOR VEHICLES ADAPTABLE TO RIDE ON RAILROAD TRACKS

[76] Inventor: Estel L. Lovitt, Jr., 5102 Brenden Way, Sylvania, Ohio 43560

[21] Appl. No.: 284,592

[22] Filed: Dec. 15, 1988

[51] Int. Cl.⁵ .............................................. B61D 15/00
[52] U.S. Cl. ................................... 105/72.2; 105/178; 301/128
[58] Field of Search .................. 295/36.1, 39, 44; 301/127, 128; 105/72.2, 178, 180, 215.2

[56] References Cited

U.S. PATENT DOCUMENTS

| | | | |
|---|---|---|---|
| 137,308 | 4/1873 | McCauley | 301/128 X |
| 1,271,010 | 7/1918 | Billington et al. | 105/178 |
| 1,642,502 | 9/1925 | Krasberg | 301/128 |
| 2,577,830 | 12/1951 | Watts et al. | 105/72.2 |
| 2,986,102 | 5/1961 | Cox | 105/72.2 |
| 3,130,686 | 4/1964 | Fiechter et al. | 105/72.2 |
| 3,980,025 | 9/1976 | Olson, Sr. et al. | 105/72.2 |
| 4,534,297 | 8/1985 | Johnson, Sr. | 105/72.2 |

FOREIGN PATENT DOCUMENTS 446444  5/1975  U.S.S.R. ............................... 105/178

Primary Examiner—Margaret A. Focarino
Assistant Examiner—Joseph D. Pape
Attorney, Agent, or Firm—George R. Royer

[57] ABSTRACT

The subject invention is an improved frame mechanism adapted to be deployed and otherwise integrally affixed on a land based motor vehicle that is adapted to retrofitted with rail wheels in addition to conventional land based wheels, in order to enable the motor vehicle to ride on railroad tracks, in addition to being capable of being driven on non-rail surfaces. The apparatus incorporating the features of the subject invention comprises, in general, a longitudinally extending support system adapted to hold the rail wheels therein, which support system is connected to the motor vehicle base frame in a transverse manner, said support system being constructed to be laterally shortened or elongated to move the wheel members inwardly or outwardly to correspondingly adjust the distance between the rail wheels.

1 Claim, 3 Drawing Sheets

ADJUSTABLE FRAME FOR RAIL WHEELS ON MOTOR VEHICLES ADAPTABLE TO RIDE ON RAILROAD TRACKS

DISCUSSION OF PRIOR ART AND BACKGROUND OF THE INVENTION

The subject invention relates in general to mechanisms that are used to integrally affix to land-based motor vehicles rail wheels to enable the motor vehicle to be driven over railroad tracks, such mechanisms required to be affixed so that the railwheels do not interfere with the rubber, land-based tires or their operation.

In this regard, it is to be noted that the deployment of rail wheels on a motor vehicle requires constant attention to the rail wheel positioning and alignment on the rails. In most instances, the rail wheels have a substantial tendency to wear on the outside portion of the wheel flange, as well as on other areas. The wearing process is caused in part by the outward forces constantly imposed on the outer surfaces of the rail wheel flanges as they ride on the rails. As this wear progresses significantly, the rail wheels become weakened, and thus become structurally unsound for their intended usage. A second problem that is encountered as this wear process develops is that the rail wheels become misaligned or spread apart relative to the opposing wheel so as to eventually cause some significant difficulty in maintaining the vehicle on the track.

In the prior and existing mechanical art that is employed as a maintenance procedure to alleviate the foregoing discussed wear problem, there are limited approaches to overcome the difficulty. One of the primary methods used involved the removal of each rail wheel on the axle, as a separate operation, whenever such spacing or alignment problems evolved, and readjusting and refitting the individual wheel back on the axle to the desired and correct spacing dimension. This process of removing each wheel individually is not only cumbersome, but is expensive and a relatively difficult procedure. Other methods utilized for this problem have proven to be equally difficult and cumbersome.

In view of the relative expense and difficulty with this rail wheel adjustment process, the subject invention has been conceived as an apparatus and process as an improvement to facilitate, at minimal expense and labor, the process of adjusting the intermediate distance between such rail wheels. The following objects of the subject invention are addressed accordingly.

OBJECTS OF INVENTION

It is an object of the subject invention to provide an improved apparatus for readjusting rail wheels on a rail bound vehicle;

It is also an object of the subject invention to provide an improved undercarriage apparatus for supporting rail wheels;

It is another object of the subject invention to provide an improved support device of an adjustable nature for supporting rail wheels;

Still another object of the subject invention is to provide an improved device for minimizing the wear and maximizing the function of rail wheels on a rail bound vehicle;

Yet another object of the subject invention is to provide an improved undercarriage support structure for rail wheels deployed on a motor vehicle adapted for non-rail and rail-based usage;

It is an object of the subject invention to provide an improved undercarriage wheel support system for a vehicle;

A further object of the subject invention is to provide an improved apparatus to minimize wear on rail wheels deployed on motor vehicles used to ride on both rails and ground or highway surfaces;

Other and further objects of the subject invention will become apparent from a reading of the following description in conjunction with the claims and drawings.

DRAWINGS

Figure 8:
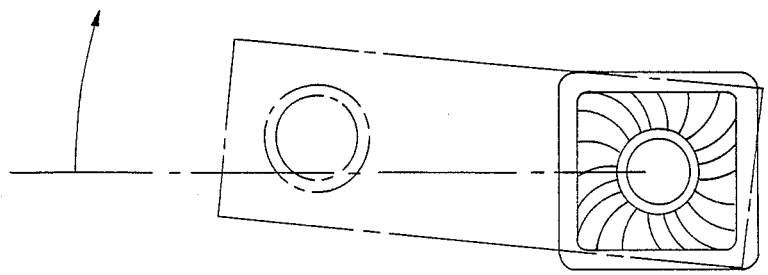
Figure 9:
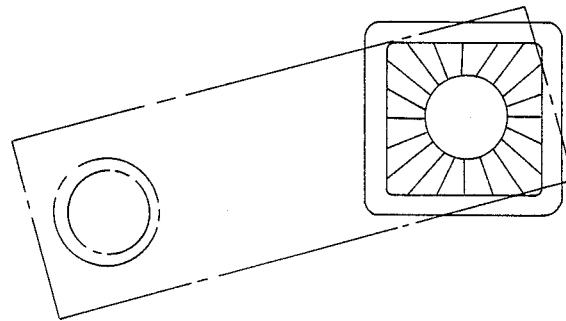
Figure 10:
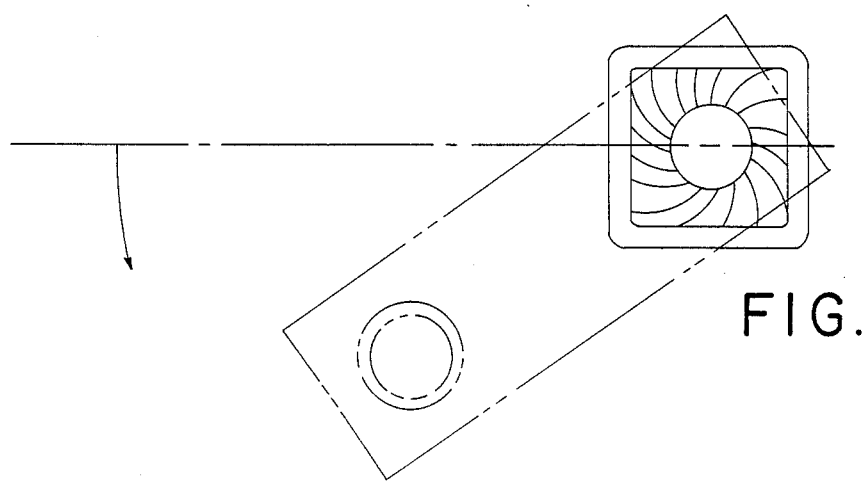

FIGS. 8, 9, and 10 are end elevational views of the lower support brace showing the internal rubber torsion system, such views showing the brace in various load positions.

DESCRIPTION OF GENERAL EMBODIMENT

The subject invention is an improved frame mechanism adapted to be deployed and otherwise integrally affixed on a land based motor vehicle that is adapted or retrofitted with rail wheels in addition to conventional land based wheels, in order to enable the motor vehicle to ride on railroad tracks, in addition to being capable of being driven on non-rail surfaces. The apparatus incorporating the features of the subject invention comprises, in general, a longitudinally extending support system adapted to hold the rail wheels therein, which support system is connected to the motor vehicle base frame in a transverse manner, said support system being constructed to be laterally shortened or elongated to move the wheel members inwardly or outwardly to correspondingly adjust the distance between the rail wheels.

DESCRIPTION OF PREFERRED EMBODIMENT

In describing the preferred embodiment of the subject invention, it is to be noted that the following description shall be of one embodiment only of several that are within the scope of the invention herein, and this description of a particular embodiment shall not be considered as limiting the scope of the invention herein. Moreover, in describing the subject invention, the following nomenclature shall be used. The word "upper" shall refer to those areas above the ground level in the motor vehicle, while the word "lower" will refer to those areas adjacent or near the ground level as appertaining to a conventionally disposed motor vehicle, as described. The words "longitudinal central axis" will refer to that axis which runs symmetrically from front to back through the front to back center line of such motor vehicle. The word "transverse" refers to direction and dispositions that are perpendicular to such longitudinal central axis.

Figure 4:
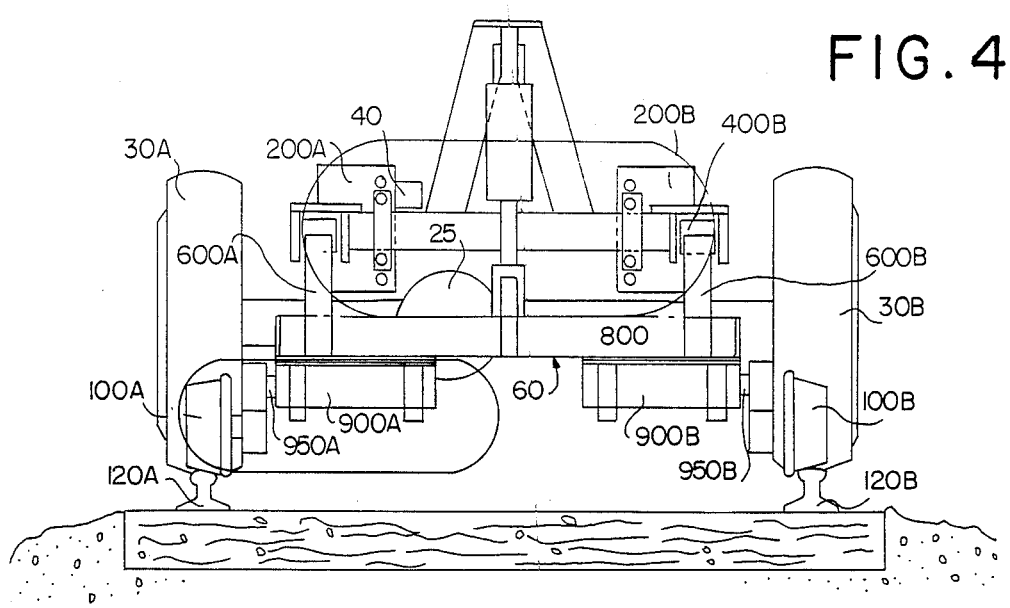
FIG. 4 is a front elevational view of the subject apparatus showing how the subject device is affixed as an undercarriage assembly to a motor vehicle.

Referring now to the drawings and particularly to FIG. 4, a conventionally disposed motor vehicle 10 is shown, in part, through a portion of its undercarriage, specifically a drive axle 20, having a differential box 25, which such drive axle having affixed rubber based wheels 30A and 30B on opposing ends of such drive axle. In the embodiment shown in FIG. 6, the drive axle is appended to the rear portion of the underside 40 of the motor vehicle. Also integrally affixed to the undersurface 40 of such motor vehicle 10 is rail support undercarriage assembly 60, which is adapted to carry and support a pair of upwardly retractable rail wheels 100A and 100B, which rail wheels are adapted to ride on the opposing rails 120A and 120B, as seen in FIG. 4. As can be seen in the drawings, the rail wheels 110A and 110B are appropriately spaced and aligned relative to one another and aligned relative to the juxtaposed rubber-based wheels 30A and 30B so that when the rail wheels 100A and 100B are retracted downwardly to fit against the rails 110A and 110B, the bottom surfaces of the adjacent rubber tires 30A and 30B ride squarely on top of the particular rails underneath the vehicle 10. It is vital to the maneuverability of the vehicle 10 on rails 110 and 110B that the rubber drive wheels 30A and 30B be squarely emplaced on such rails, since motive power during the rail drive feature is still transferred from the power train of the motor vehicle 10 directly to drive wheels 30A and 30B. Thus, any misalignment of the rubber drive wheels 30A and 30B on such rails will result not only in inefficient power transfer, but will render it difficult to keep the motor vehicle 10 properly aligned on the tracks.

Motor vehicle 10, as can be surmised, has in addition to rear drive wheels 30A and 30B, a front set of rubber-based wheels, not shown, as well as a front set of retractable rail wheels, not shown. The front set of rail wheels have a similar undercarriage support assembly 60 as that shown for the rear assembly for rear rail wheels 100A and 100B and any drawings or description of such front assembly would be redundant and thus unnecessary. Therefore, specific attention will be given to the rear support assembly 60, as more fully discussed below.

Figure 1:
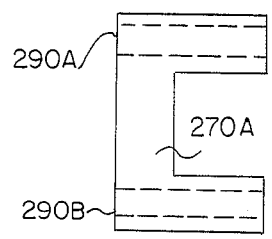
FIG. 1 is a side elevational view of a support collar used in the subject invention.
Figure 2:
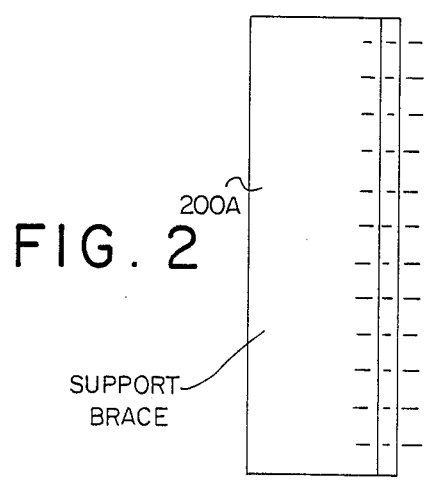
FIG. 2 is a top elevational view of the subject apparatus.
Figure 3:
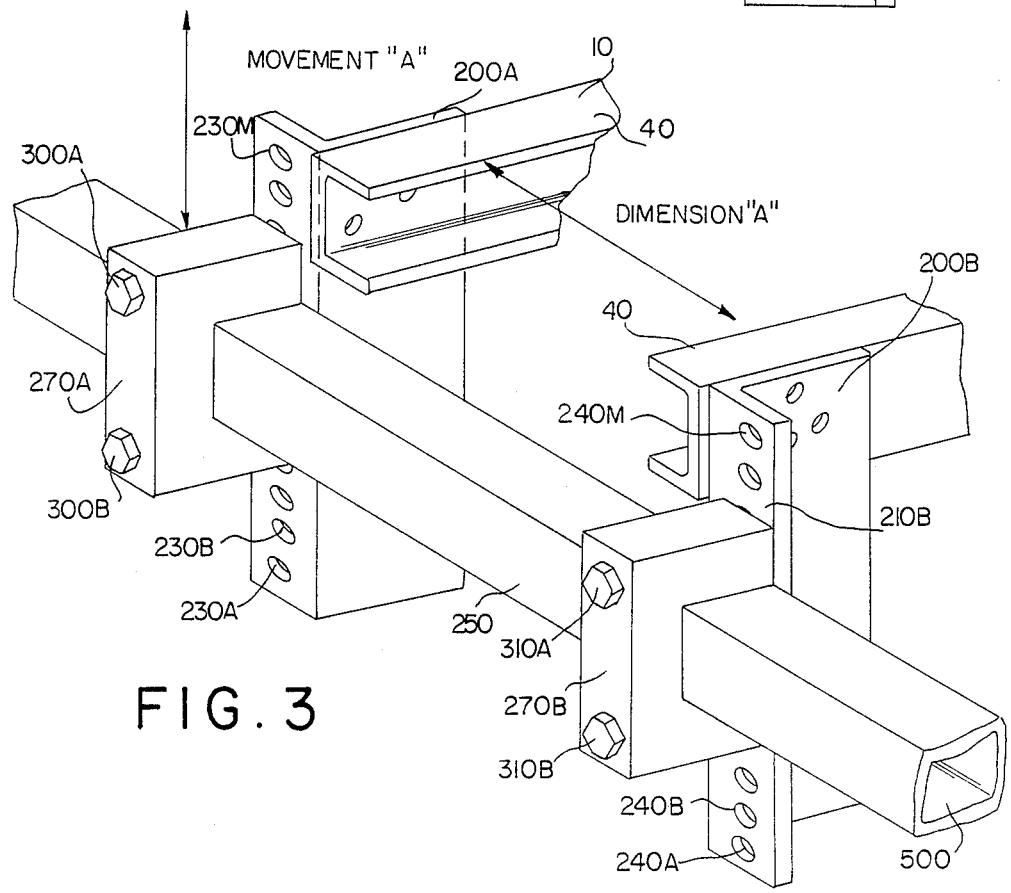
FIG. 3 is a perspective view of the main transverse member used in the subject apparatus.
Figure 5:
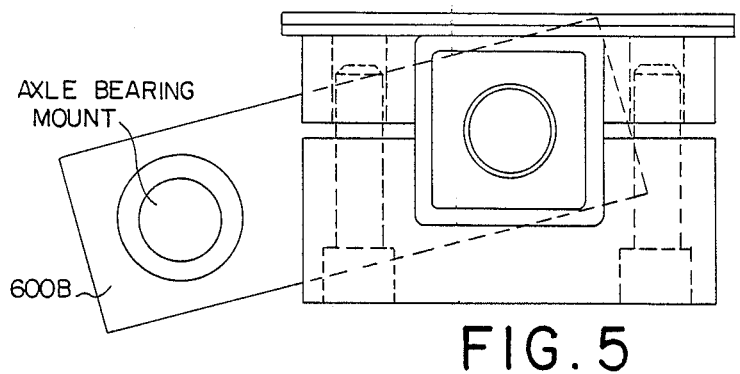
FIG. 5 is a side elevational view of the transverse main support member.
Figure 6:
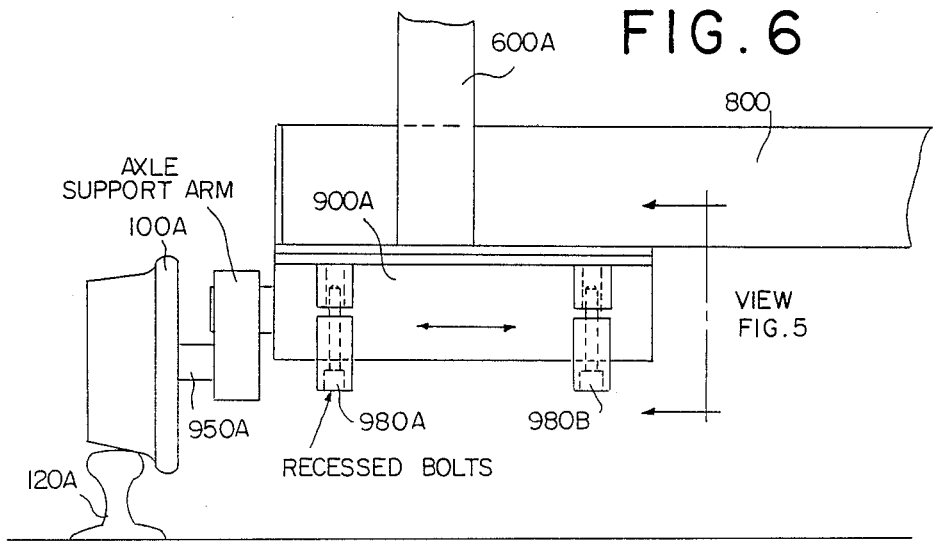
FIG. 6 is a front elevational view of the subject apparatus showing how the wheel base adjustment is effected.
Figure 7:
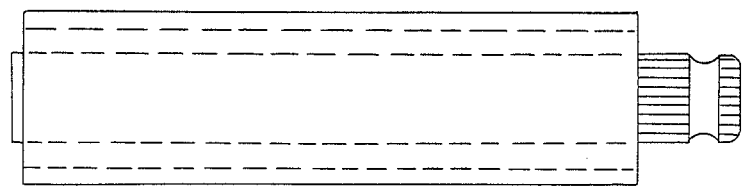
FIG. 7 is a front elevational view of the lower support brace.

Attention is again addressed to FIGS. 4 and 6 in which a detailed view of the rail wheel undercarriage assembly 60 is shown. As seen, the undercarriage assembly 60 is basically and generally a transverse member having a retractable apparatus which raises or lowers the rail wheels between the rail driven position shown in FIG. 5 to a retracted position folded up underneath the undersurface 40 of the vehicle 10. The latter retracted position is used when the vehicle 10 is not being driven over rails, but over roads or similar non-rail surfaces. As shown in FIGS. 4 and 6, the upper portion of the undercarriage assembly 60 is comprised of a pair of vertical brace members 200A and 200B. These latter brace members 200A and 200B are adapted to be integrally affixed, in a vertically downwardly depending manner, to the frame member 40 on the undersurface of the vehicle 10, as can be seen in the drawings. Further, as can be seen from a view of FIGS. 3 and 4, each vertical brace member 200A and 200B is an L-shaped member, as viewed from an upper elevational view with the rearwardly face 210A and 210B of each brace member having a plurality of evenly-spaced openings 230A, 230B ... 230M and 240B, 240B ... 240M, respectively, extending in an even row in series fashion from the upper end to the lower end of each such face 210A and 210B for the opposing brace members 200A and 200B respectively. As can be seen in FIG. 3, a transverse upper brace member 250 is affixed against the respective rear faces of vertical brace members 200A and 200B, as shown. As shown in FIGS. 3 and 4, the upper transverse brace 250 is a parallelopiped member, having a rectangular cross-sectional configuration with a hollow parallelopiped shaped interior 255. Upper transverse brace member 250 is adapted to extend transversely or perpendicularly to the longitudinally extending, front to rear, central axis of the motor vehicle 10. Securing the upper transverse brace 250 against the vertical brace members 200A and 200B are a pair of C-shaped collar members such as collar member 250A shown in FIG. 1. Collar members 270A and 270B are adapted to fit securely and conformingly around the outer surface of the rectangular cross-sectional configuration of the upper transverse cross brace member 250 as shown in FIG. 3. A pair of circular openings 290A and 290B are formed into the C-shaped collar 270A to receive conforming bolt members 300A and 300B, the ends of which, in turn, are insertible into a separated pair of the various openings 230A, 230B ... 230M in the rear face of the vertical brace members 200A. In similar fashion, C-shaped collar 270B functions to connect the opposing side of the upper cross brace 250 to the rear face of the vertical brace 200B.

As shown in FIG. 3, each collar 270A and 270B can be moved up or down along the rear faces 210A and 210B of vertical braces 200A and 200B to correspondingly move the transverse brace 250 up or down limited distances determined by the spacing and number of openings 230A ... 240M disposed, as stated, in the rear faces of the vertical support braces 200A and 200B. This vertical adjustment of the upper transverse brace 250 is accomplished by loosening the bolt members 300A, 300B, 310A and 310B and removing such bolts from the openings and repositioning them for the desired height location, as can be readily determined from a view of FIG. 3. As can be seen in FIG. 3, and as indicated above, the C-shaped clamps are adapted to fully grasp at least three outer face portions of the upper transverse brace member 250.

Referring again to the drawings, and particularly FIGS. 4 and 6, the upper transverse brace member 250 is the upper support of member. The specific structure of the upper cross brace member 250 in the preferred embodiment of the subject invention incorporates a hollow longitudinally extending internal chamber 500, with such internal chamber generally conforming to the outer shape of the cross brace member 250.

Rotatably affixed to each end of the transverse upper brace member 250 and longitudinally extending rotatable arms 600A and 600B that are affixed on their respective upper ends to the opposing ends of each end of the upper transverse brace member 250, as shown. As shown in FIGS. 4, 5 and 6, the rotatable arms 600A and 600B are vertically depending members that are adapted to move through an arc of approximately ninety degrees from a pivotal center defined by the longitudinal central axis of the transverse brace member 250, as seen, such ninety degree arc generally extending from a horizontal plane parallel to ground to a vertically downwardly position as seen in FIG. 4. As seen in FIG. 3 the upper portions of the rotatable arms 600A and 600B are rotatable between the fixed upper horizontal position to a fixed vertically depending position through hydraulic lifting means, not shown. These respective positions are rigidly fixed with the lower position being that position with the wheels moved downwardly.

Integrally affixed to the lower or distal ends 620A and 620B of the rotatable arms 600A and 600B is the lower transverse support bar member 800, as seen in FIG. 4, which functions to support the lower portion of the rail wheel assembly, as shown. In particular, the lower transverse support member 800 is movable up and down through an arc of ninety degrees from the upper raised position to the lower position with the rails positioned on the rails, as shown. More specifically, the lower ends of the rotatable arms rotate through hydraulic means to lift the lower transverse support ball through a ninety degree arc.

Integrally affixed to the lower portion of the lower transverse support beam are separate longitudinally extending wheel support members 900A and 900B that function to indirectly support the respective rail wheel axles 950A and 950B, as shown. As shown in the drawings, these wheel support members are adjustable in a longitudinal direction along axis C—C so as to adjust the distance between the rail wheels. Specifically, in order to accomplish this aspect, the rail axle support member has adjustable collars 980A and 980B that can be loosened to slide the rail support member in or out as depicted in FIG. 6. This will permit the rail axles 1000A and 1000B to be moved in and out for adjustment purposes.

I claim:

1. An apparatus for adjustment of auxiliary rail wheels that are rotatably mounted on a land based motor vehicle with a frame that is affixed with such auxiliary rail wheels for maneuvering such vehicle on rails, said apparatus comprising:

(a) an upper support member having two ends affixed to the underside of the motor vehicle frame, said upper support member being a parallelopiped-shaped member with a rectangular cross-sectional configuration and having a hollow interior, said upper support member being disposed transversely to longitudinally extending front to rear central axis of said motor vehicle, said upper support member having a pair of rotatable arms wherein each rotatable arm has an upper end and a lower end, with the upper ends rotatably affixed on each end of said support member adapted to be moved up or down in an arc of ninety degrees from a horizontal position to a vertical position;

(b) a lower transverse beam connected to the lower ends of each of said rotatable arms, said lower transverse beam having rail wheel axles connected to a pair of slidable adjustment members on each end on said lower transverse beam adapted to slide back and forth along the ends of said lower transverse beam, with rail wheels rotatably affixed on each slidable adjustment member, to move the rail wheels in or out relative to one another.

* * * * *